United States Patent [19]

Brodeur

[11] 4,150,380
[45] Apr. 17, 1979

[54] LORAN-C EQUIPMENT ALIGNMENT

[75] Inventor: Lester R. Brodeur, Nashua, N.H.

[73] Assignee: Sanders Associates, Inc., Nashua, N.H.

[21] Appl. No.: 881,485

[22] Filed: Feb. 27, 1978

Related U.S. Application Data

[62] Division of Ser. No. 741,268, Nov. 12, 1976, Pat. No. 4,104,635.

[51] Int. Cl.$^2$ ............................................... G01S 1/26
[52] U.S. Cl. .................................................... 343/103
[58] Field of Search ............................ 343/103, 105 R

[56] References Cited

U.S. PATENT DOCUMENTS

| | | | |
|---|---|---|---|
| 3,573,828 | 4/1971 | Hawley | 343/103 |
| 3,736,590 | 5/1973 | Lipsey et al. | 343/103 |
| 4,104,635 | 8/1978 | Brodeur | 343/103 |

*Primary Examiner*—T. H. Tubbesing
*Assistant Examiner*—Richard E. Berger
*Attorney, Agent, or Firm*—Louis Etlinger; Joseph E. Funk

[57] ABSTRACT

LORAN-C navigation equipment is disclosed wherein digital circuitry is used to automatically distinguish a master LORAN-C transmitting station from a secondary station. The equipment operator manually enters approximate time difference of signal arrival information for a particular secondary station into the equipment after consulting a LORAN-C chart. The operator then manually determines the exact time difference of arrival using thumbwheel switches and a LED lamp display. This procedure is repeated to determine exact time difference of arrival information for the master and each selected secondary station, and the information is plotted in a well-known manner on the LORAN-C chart to locate the position of the craft upon which the equipment is located. Manual acquisition of secondary stations simplifies the equipment and eliminates interference problems caused by skywaves and other transmissions. The set oscillator is easily and quickly caibrated by the operator who manually enters the LORAN-C chain group repetition interval information found on the LORAN-C chart on the thumbwheel switches of the receiver and then adjusts the oscillator for an match as indicated on the LED display.

2 Claims, 11 Drawing Figures

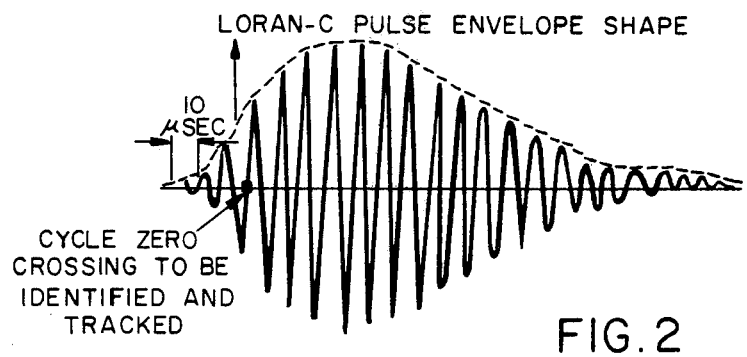
FIG. 2
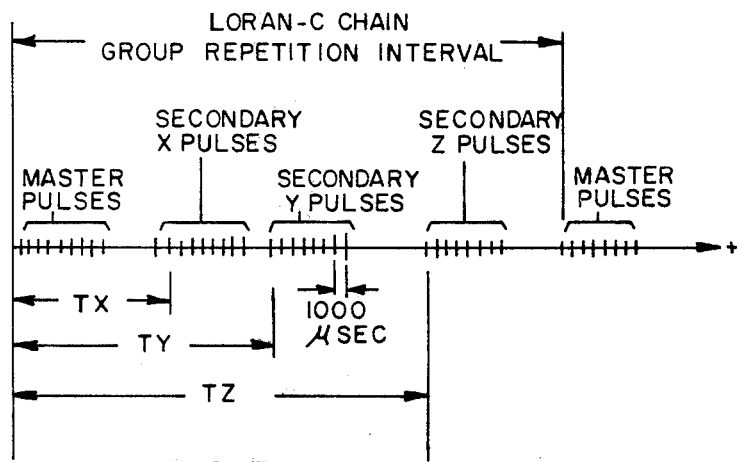
FIG. 3
FIG. 5A
FIG. 5B
FIG. 10
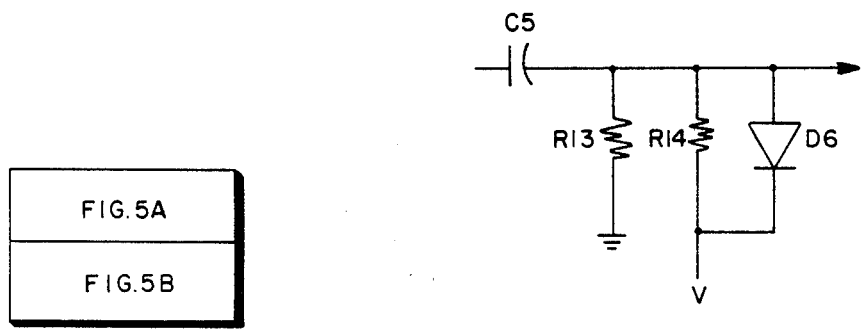
FIG. 9

LORAN-C EQUIPMENT ALIGNMENT

This is a division of application Ser. No. 741,268, now U.S. Pat. No. 4,104,635, filed Nov. 12, 1976.

FIELD OF THE INVENTION

This invention relates to navigational equipment and more particularly to hyperbolic navigational equipment utilizing the time difference in the propagation of radio frequency pulses from synchronized ground transmitting stations.

BACKGROUND OF THE INVENTION

Throughout maritime history navigators have sought an accurate reliable method of determining their position on the surface of the earth and many instruments such as the sextant were devised. During the second world war, a long range radio-navigation system, LORAN-A, was developed and was implemented under the auspices of the United States Coast Guard to fulfill wartime operational needs. At the end of the war there were seventy LORAN-A transmitting stations in existence and all commercial ships, 5 having been equipped with LORAN-A receivers for wartime service, continued to use this navigational system. This navigational system served its purpose but shortcomings therein were overcome by a new navigational system called LORAN-C.

Presently there are eight LORAN-C multi-station transmitting chains in operation by 1980. This new navigational system will result in an eventual phase-out of the earlier LORAN-A navigational system.

LORAN-C is a pulsed low-frequency (100 kilohertz), hyperbolic radio navigation system. LORAN-C radio navigation systems employ three or more synchronized ground stations that each transmit radio pulse chains having, at their respective start of transmissions, a fixed time relation to each other. The first station to transmit is referred to as the master station while the other stations are referred to as the secondary stations. The pulse chains are radiated to receiving equipment that is generally located on aircraft or ships whose position is to be accurately determined. The pulse chains transmitted by each of the master and secondary stations is a series of pulses, each pulse having an exact envelope shape, each pulse chain transmitted at a constant precise repetition rate, and each pulse separated in time from a subsequent pulse by a precise fixed time interval. In addition, the secondary station pulse chain transmissions are delayed a sufficient amount of time after the master station pulse train transmissions to assure that their time of arrival at receiving equipment anywhere within the operational area of the particular LORAN-C system will follow receipt of the pulse chain from the master station.

Since the series of pulses transmitted by the master and secondary stations is in the form of pulses of electromagnetic energy which are propagated at a constant velocity, the difference in time of arrival of pulses from a master and a secondary station represents the difference in the length of the transmission paths from these stations to the LORAN-C receiving equipment.

The focus of all points on a LORAN-C chart representing a constant difference in distance from a master and a secondary station, and indicated by a fixed time difference of arrival of their 100 kilohertz carrier pulse chains, described a hyperbola. The LORAN-C navigation system makes it possible for a navigator to exploit their hyperbolic relationship and precisely determine his position using a LORAN-C chart. By using a moderately low frequency such as 100 kilohertz, which is characterized by low attenuation, and by measuring the time difference between the reception of the signals from master and secondary stations, the modern-day LORAN-C system provides equipment position location accuracy within two hundred feet and with a repeatability of within fifty feet.

The theory and operation of the LORAN-C radio navigation system is described in greater detail in an article by W. P. Frantz, W. Dean, and R. L. Frank entitled "A Precision Multi-Purpose Radio Navigation System," 1957, I.R.E. Convention Record, Part 8, page 79. The theory and operation of the LORAN-C radio navigation system is also described in a pamphlet put out by the Department of Transportation, United States Coast Guard, Number CG-462, dated August, 1974 and entitled "LORAN-C User Handbook".

The LORAN-C system of the type described in the aforementioned article and pamphlet and employed at the present time, is a pulse type system, the energy of which is radiated by the master station and by each secondary station in the form of pulse trains which include a number of precisely shaped and timed bursts of radio frequency energy as priorly mentioned. All secondary stations each radiate pulse chains of eight discrete time-spaced pulses, and all master stations transmit the same eight discrete time-spaced pulses but also transmit an identifying ninth pulse which is accurately spaced from the first eight pulses. Each pulse of the pulse chains transmitted by the master and secondary stations has a 100 kilohertz carrier frequency, so that it may be distinguished from the much higher frequency carrier used in the predecessor LORAN-A system.

The discrete pulses radiated by each master and each secondary LORAN-C transmitter are characterized by an extremely precise spacing of 1,000 microseconds between adjacent pulses. Any given point on the precisely shaped envelope of each pulse is also separated by exactly 1,000 microseconds from the corresponding point on the envelope of a preceding or subsequent pulse within the eight pulse chains pulses. To insure such precise time accuracy, each master and secondary station transmitter is controlled by a cesium frequency standard clock and the clocks of master and secondary stations are synchronized with each other.

As mentioned previously, LORAN-C receiving equipment is utilized to measure the time difference of arrival of the series of pulses from a master station and the series of pulses from a selected secondary station, both stations being within a given LORAN-C chain. This time difference of arrival measurement is utilized with special maps having time difference of arrival hyperbola information printed thereon. These maps are standard LORAN-C hydrographic charts prepared by the United States Coast Guard and the hyperbola curves printed thereon for each secondary station are marked with time difference of arrival information. Thus, the difference in time arrival between series of pulses received from a master station and selected ones of the associated secondary stations must be accurately measured to enable the navigator to locate the hyperbola on the chart representing the time difference measured. By using the time difference of arrival information between a master station and two or more secondary stations, two or more corresponding hyperbolae can be located on the chart and their common point of intersection accurately identifies the position of the LORAN-C receiver. It is clear that any inaccuracies in measuring time difference of arrival of signals from master and secondary transmitting stations results in position determination errors.

There are other hyperbolic navigation systems in operation around the world similar to LORAN-C, and with which my novel receiver can readily be adapted to operate by one skilled in the art. There is a LORAN-D system utilized by the military forces of the United States, as well as the aforementioned LORAN-A system. Others are DECCA, DELRAC, OMEGA, CYTAC, GEE and the French radio WEB, all of which operate in various portions of the radio frequency spectrum and provide varying degrees of positional accuracy.

LORAN-C receiving equipment presently in use is relatively large in size, heavy and requires relatively large amounts of power. In addition, present LORAN-C receivers are relatively expensive and, accordingly, are found only on larger ships and aircraft. Due to the cost, size, weight, and power requirements of present LORAN-C receiving equipment, such equipment is not in general use on small aircraft, fishing boats and pleasure boats. In addition, LORAN-C receiving equipment presently in use required anywhere from five to ten minutes to warm up and provide time difference measurement information. Further, present LORAN-C equipment is rather complex, having many controls, and the operator thereof usually must have some training in the use of the equipment.

Thus, there is a need in the art for a new LORAN-C receiver that is small, light in weight, has few controls and is therefore easy to operate by inexperienced people, requires a small amount of electrical power, and is relatively low in cost. Such equipment would fill the needs of those who do not now have LORAN-C receiving equipment.

SUMMARY OF THE INVENTION

The foregoing needs of the prior art are satisfied by my novel LORAN-C receiver. I eliminate much of the complex and costly automatic acquisition and tracking circuitry in prior art LORAN-C navigation receivers and provide a small, light weight, inexpensive receiver using relatively little electrical power.

My novel LORAN-C equipment has a receiving section that receives all signals that appear within a small bandwidth centered upon the 100 kilohertz operating frequency of the LORAN-C network. Digital register and logic circuitry is then used to check the pulse train of all received signals to search for the unique nine pulse signal transmission by a LORAN-C master station. Whatever pulse trains are received by the navigation receiver are placed in the register and the presence of a properly spaced master station ninth pulse is determined with the logic circuitry. If the proper sequence of eight properly spaced pulses followed by the spaced ninth pulse is not received, the receiver disregards the pulse train. In this manner the applicant's navigation receiver disregards all types of spurious signals and LORAN-C secondary station signals which do not include the ninth pulse and responds only to a master station pulse train.

Upon receipt of a master station pulse train the remaining circuitry in the applicant's navigation receiver is enabled. Rather than use automatic circuitry to analyze and sort between received spurious signals and a number of secondary station signals to search for a selected secondary station signal, the applicant utilizes five manually operated thumbwheel switches coupled with digital comparator circuits and a light emitting diode (LED) readout display to locate a desired LORAN-C secondary station pulse train. The purpose of the thumbwheel switches is to set a fairly narrow search window in time only within which the desired secondary station pulses train transmission can be searched for. The initial time position of the search window is set by the two higher order thumbwheel switches after the navigation receiver operator consults a LORAN-C navigation chart for the area within which the receiver operator is navigating. Error in setting the first two thumbwheel switches upon consultation of the LORAN-C navigation chart is improbable because the operator can generally guess his location within one hundred miles. It will be noted upon consulting LORAN-C hydrographic charts (see FIG. 4 for example) that the first two digits of time difference measurements on the curves for a given secondary station is constant over a wide area within which the receiver operator should know he is operating. These first two digits are those entered on the two higher order switches.

The LED readout display associated with four lower thumbwheel switches indicate to the operator if the selected secondary station pulse train transmission is high, low, or centered within the search window selected with the two higher order switches. The four lower order thumbwheel switches are then sequentially used to progressively narrow the search window while keeping the fifth pulse of the pulse train transmission from the selected secondary station centered in the successively narrowed search window. In this manner, the receiver operator quickly and easily narrows the receiver search window until only the fifth pulse of the eight pulse train from the selected LORAN-C secondary station is received. After this procedure has been followed, the decimal numbers on the six thumbwheel switches of my receiver directly give the time difference of arrival between the fifth pulse of the master station pulse train and the fifth pulse of the selected secondary station pulse train. The operator of the applicant's navigation receiver takes this six digit number on the thumbwheel switches and locates the corresponding hyperbola or line of position (LOP) on the LORAN-C navigation chart. It should be noted that the LORAN-C charts only have five digit time difference on arrival numbers on the LOPs. This corresponds to the five highest order digits on my thumbwheel switches. The sixth or lowest order digit on my thumbwheel switches is used to interpolate between LOPs on the LORAN-C chart. In a well-known manner, the operator will determine a second and possibly even a third LOP utilizing the navigation receiver and the intersection of these LOPs on the LORAN-C chart indicates the position of the receiver.

The above described operation realizes some of the advantages of my novel LORAN-C receiver. By using the manually positioned and narrowed search window the receiver operator effectively filters out spurious signal and undesired secondary station pulse train transmissions, without complex, costly, bulky and relatively high power conserving circuitry.

In an alternative embodiment of my invention a commercially available integrated circuit microprocessor may be used to perform the final search window narrowing after the first two digits are manually entered into the receiver to initially determine the search window for the selected secondary station. The techniques of programming such a microprocessor to analyze the comparator outputs and generate signals to shift and narrow the search window are relatively simple and obvious to one skilled in the art.

The operator of my novel LORAN-C navigation receiver can quickly and easily calibrate the receiver master oscialltor, unlike prior art receivers. To accomplish this, the operator consults the LORAN-C navigation chart for the area in which the receiver is located and takes the group repetition interval (GRI) information for the LORAN-C chain covering the area and enters this information into the navigation receiver using the aforementioned thumbwheel switches. When the receiver internal oscillator is properly set all lamps of the LED display are lit. When the navigation receiver oscillator is not accurately set, the LED display will so indicate by not having all LED lamps lit, and the operator then operates a front panel calibration adjustment to quickly set the frequency of the receiver master oscillator to the correct frequency as indicated by all lamps of the LED display being lit.

The applicant's novel LORAN-C navigation receiver will be better understood upon a review of the detailed description given hereinafter in conjunction with the drawing in which:

FIG. 2 shows the shape of each pulse of the pulse trains transmitted by all LORAN-C master and secondary stations;

FIG. 3 is a graphical representation of the pulse trains transmitted by the master and secondary stations within a LORAN-C chain;

FIG. 9 is a schematic diagram of an integrator used within the applicant's navigation receiver; and FIG. 10 shows the manner in which FIG. 5A and FIG. 5B should be arranged with respect to each other when reading the detailed description.

GENERAL DESCRIPTION

Figure 1:
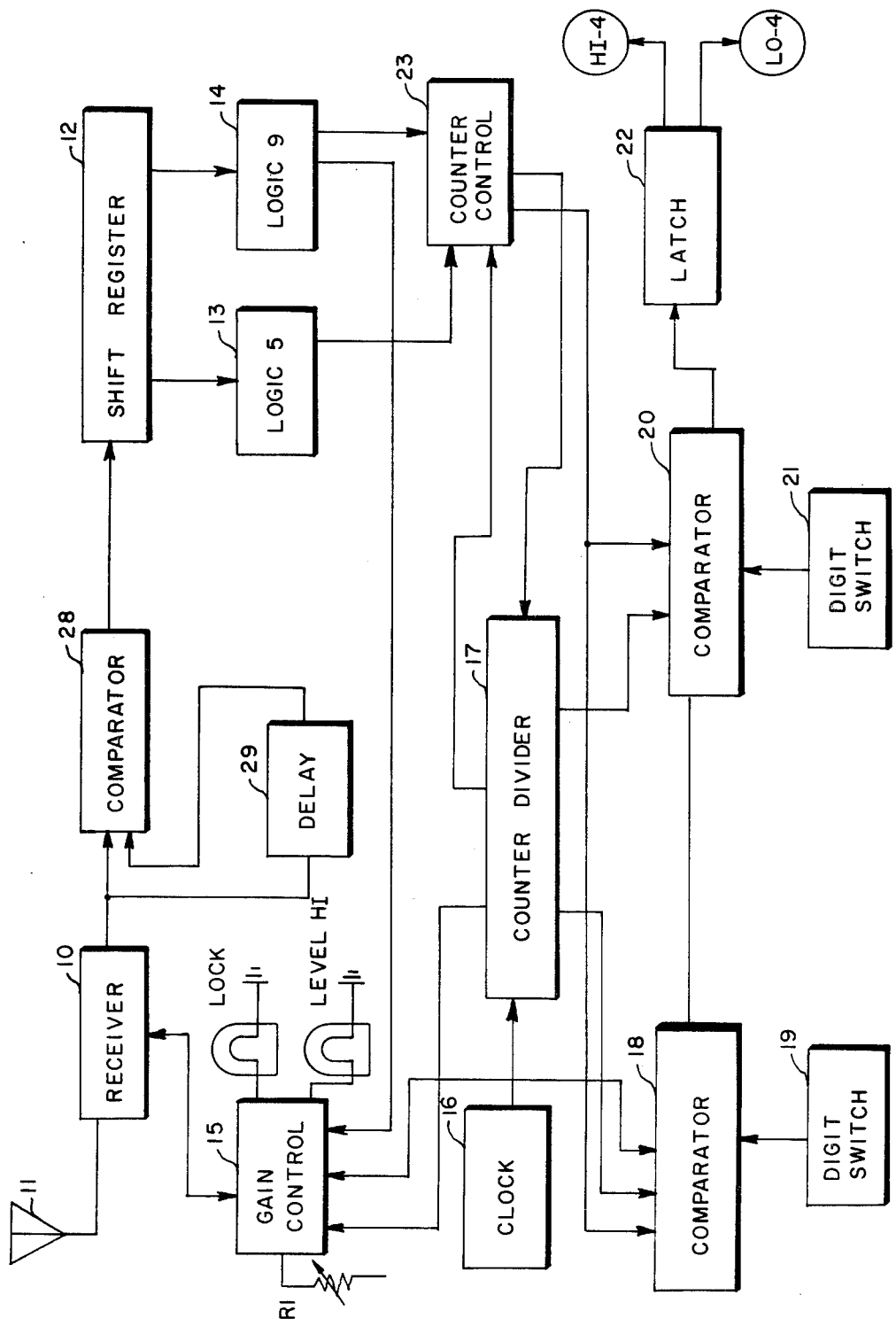
FIG. 1 is a general block diagram of the applicant's navigation receiver.

To understand the general or detailed operation of my novel LORAN-C receiver, it is best to first understand the makeup of the signals transmitted by LORAN-C stations and being received by my novel receiver. Representations of these signals are shown in FIGS. 2 and 3 which will now be discussed.

All master and secondary stations transmit groups of pulses as briefly mentioned above, at a specified group repetition interval which is defined as shown in FIG. 3. Each pulse has a 100 Khz carrier and is of a carefully selected shape shown in FIG. 2. For each LORAN-C chain a group repetition interval (GRI) is selected of sufficient length so that it contains time for transmission of the pulse chains from the master station and each associated secondary station, plus time between the transmission of each pulse train from the master station so that signals received from two or more stations within the chain will never overlap each other when received anywhere in the LORAN-C chain coverage area. Each station transmits one pulse chain of eight or nine pulses per GRI as shown in FIG. 3. The master station pulse chain consists of eight pulses, each shaped like the pulse shown in FIG. 2, with each of the eight pulses spaced exactly 1,000 microseconds apart, and with a ninth pulse spaced exactly 2,000 microseconds after the eighth pulse. The pulse chain for each of the secondary stations X, Y and Z contains eight pulses shaped as shown in FIG. 2, and each of the eight pulses is also spaced exactly 1,000 microseconds apart. The pictorial representation of the pulses transmitted by the master station and the three secondary stations X, Y and Z associated therewith shown in FIG. 3 shows that the pulse trains never overlap each other and all are received within the group repetition interval. FIG. 3 also shown a representative time difference of arrival of the pulse train from each of the secondary stations with respect to the master station. These time difference of arrival figures are designated Tx, Ty and Tz and are the time differences measured using my receiver.

It is to be recognized that the time difference of arrival between reception of the pulse train from the master station and the pulse trains from each of the X, Y and Z secondary stations will vary depending upon the location of the LORAN-C receiving equipment with the coverage area for a LORAN-C chain. In addition, the signal strength of the received signals from the master and secondary stations will also vary depending upon the location of the receiving equipment, as represented by the different heights of the representative pulse lines shown in FIG. 3.

The delayed or spaced ninth pulse of each master station not only identifies the pulse train as being from a master station, but the ninth pulse is also turned on and off by the Coast Guard in a "blink" code, well known in the art, to indicate particular faulty secondary stations in a LORAN-C chain. These "blink" codes are published by the Coast Guard on the LORAN-C charts.

Each of the nine pulses from the master station and each of the eight pulses from each secondary station in a LORAN-C chain are also changed in phase to allegedly correct for skywave interference in a manner well known in the art. Skywaves are echoes of the transmitted pulses which are reflected back to earth from the ionosphere. Such skywaves may arrive at the LORAN-C receiver anywhere between 35 microseconds to 1,000 microseconds after the ground wave for the same pulse is received. In the 35 microsecond case, the skywave will overlap its own groundwave while in the 1,000 microsecond case the skywave will overlap the groundwave of the succeeding pulse. In either case the received skywave signal has distortion in the form of fading and pulse shape changes, both of which can cause positional errors. To prevent the long-delay skywaves from effecting time difference measurements, the phase of the 100 Khz carrier is changed for each pulse of a pulse train in accordance with a predetermined pattern. In these phase code patterns, which are published by the Coast Guard on the LORAN-C charts, the fifth pulse always has a positive phase and is never changed. It is this fifth pulse which is searched for by my novel LORAN-C navigation receiver as I disregard the phase changes and thus disregard the alleged skywave problems. In reality, very late skywaves (1,000 microseconds) cause little or no problems so I disregard the phase code. In World War II when the LORAN-C systems were installed the carrier phase coding was used as a military security method, but after the war when the need for military security ceased, the phase coding was called a skywave unscrambling aid. In addition, my novel receiver does not post incoming signals by Group Repetition Rate as is done in the prior art.

The exact pulse envelope shape of each of the pulses transmitted by all master and secondary stations is also very carefully selected to aid in measuring the exact time difference in arrival between a pulse train from a master station and a pulse train from a secondary station as is known to those skilled in the art. To make exact time difference measurement one method the prior art teaches is superpositions matching pulse envelopes of pulses from a master station and a selected secondary station. Another method is detection of a specific zero-crossing of the 100 Khz carrier of the master and secondary station pulses.

Now that the reader has an understanding of the nature of the signals transmitted by the LORAN-C master and secondary stations the reader can better understand the operation of my novel LORAN-C receiver which will now be described.

In FIG. 1 is seen a general block diagram of my novel LORAN-C navigation equipment. Receiver 10 is of a conventional design of the type utilized in all LORAN-C receivers and is tuned permanently to a center frequency of 100 Khz, which is operating frequency of LORAN-C transmitting stations. Receiver 10 functions with antenna 11 in a manner well known in the art to receive these signals.

Demodulated pulses from receiver 10 are applied to a first input of comparator 28. In addition, the demodulated pulse is amplified and delayed ten microseconds by delay circuit 29 and then applied to a second input of comparator 28. This circuitry is adjusted so that comparator 28 provides an output signal starting at the point where the two waveform envelopes input thereto first cross each other which, due to the adjustment, is immediately prior to the third zero crossing of the carrier frequency of each pulse received by receiver 10. FIG. 2 shows this zero crossing and time difference measurements are made by measuring the time interval between the third zero crossing of the fifth pulse of the master station pulse train and the third zero crossing of the fifth pulse of the selected second station pulse train. There is an output from comparator 28 for each of the eight pulses transmitted by the master and secondary stations and for the ninth pulse transmitted only by the master station. The output from comparator 28 is applied to shift register 12 which is shifted in response to pulses from clock 16 to store each pulse of the nine pulse train and eight pulse train transmitted by the master and secondary stations respectively. Logic/5 circuit 13 and logic/9 circuit 14 are connected to the stages (not shown) of shift register 12 to detect and respectively indicate when the fifth pulse of the eight pulse train transmitted by both master and secondary stations is received, and when a properly spaced ninth pulse is received indicating that the received pulse train being input to shift register 12 is from a master station.

The outputs from logic/5 circuit 13 and logic/9 circuit 14 are input to counter control 23 as shown. There is another input to counter control 23 from counter/divider circuit 17 which is a conventional pulse counter circuit driven by clock circuit 16. There are also outputs from counter/divider 17 to comparators 18 and 20. The previously mentioned circuits of my novel LORAN-C receiver cooperate to accurately measure the time difference of arrival between the pulse train from a master station and the pulse train from a selected secondary station as is now described.

Clock 16 generates a 10 megahertz clock signal which is applied to counter/divider 17 during the period that the LORAN-C receiver is energized. Counter/divider 17, however, is only enabled to count at specific times under control of counter control 23. More specifically, counter/divider 17 is normally disabled from counting and is only enabled to count by control circuit 23 upon logic/5 circuit 13 indicating that receipt of the fifth pulse of a pulse train whether it be from a master station or from a secondary station. If logic/9 circuit 14 does not indicate the presence of the ninth pulse of a master station within 5,000 microseconds after the counter enable signal from logic/5 circuit 13 to counter control circuit 23, counter control circuit 23 responds to the absence of the ninth pulse signal to thereafter disable counter/divider circuit 12 from continuing counting and to reset the counter stages to zero. In the event, however, that a signal is output from logic/9 circuit 14 to control circuit 23 indicating the presence of the ninth pulse of a master station, counter control circuit 23 allows counter/divider circuit 17 to continue counting until the pulse train signal from the selected secondary station should be received. When circuit 17 is thereby made to stop counting, the count therein indicates the time difference between receipt of the pulse trains from the master station and the selected secondary station.

During the time period that the stages of counter/divider 17 are counting the pulses from clock 16, the count in counter 17 is being applied via the leads to comparator 18 and comparator 20 and other intermediate comparator circuits (not shown) but which are described in the detailed description portion of this specification. The contents of counter/divider circuit 17 are input to the comparators including comparators 18 and 20 in binary coded decimal (BCD) form. Comparators 18 and 20 are always comparing the count in count/divider circuit 17 with the output from digit switches 19 and 21, which indicates the settings of these switches, and provides outputs when the outputs are numerically equal.

Digit switches 19 and 21 and intermediate digit switches not shown are manually operated thumbwheel switches having decimal numbers on their face, and providing BCD coded outputs to comparators 18 and 20 and intermediate comparators (not shown) indicative of the decimal numbers on the front of the thumbwheel switches. The operator of my novel LORAN-C receiver manually sets these switches as described hereinafter. Comparator circuits 18 and 20 compare the contents of counter/divider circuit 17 and the settings of digit switches 19 and 21, and provide one of three outputs which are stored in latch circuits, not shown in FIG. 1, but shown in other figures and described in detail further in this specification, and which are part of comparators 18 and 20. The first of the three outputs from each of the comparators indicates if the digit switch 19 and 21 settings are higher than the contents of counter/divider circuit 17 at the moment a comparison is made by comparators 18 and 20. The second output from comparators 18 and 20 indicates if the contents of counter/divider circuit 17 and digit switches 19 and 21 are equal and, finally, the third output from comparators 18 and 21 indicates if the input thereto from digit switches 19 and 21 is lower than the numerical input from counter/divider 17. In FIG. 1, the three latches associated with each of the comparators is represented by latch 22 which has outputs connected to the LED lamp HI-4 and the LED lamp LO-4. When comparator 20 indicates that the setting of digit switch 21 is higher than the corresponding counter stage of counter/divider 17, it energizes the appropriate one of the three latches in latch 22 which lights lamp HI-4. Upon comparator 20 determining that the setting of digit switch 21 is equal to the count in the corresponding stage of counter/divider 17, comparator 20 energizes the second latch in latch 22 which lights both lamps HI-4 and LO-4. Finally, when comparator 20 determines that the setting of digit switch 21 is lower than the count in the corresponding stages of counter/divider 17, comparator 20 energizes the third latch 22 which causes only lamp LO-4 to be lit. In this manner, the lighting of the lamps HI-4 and LO-4 indicate to the operator of my novel LORAN-C receiver whether or not the setting of digital switch 21 is correct. In the event that either the HI-4 or the LO-4 lamps are individually lit, each respectively indicating that the digit switch 21 setting is high or low, the operator of the receiver changes the setting of digit switch 21 until both lamps HI-4 and LO-4 are concurrently lit indicating the correct of digit switch 21. More particularly, these lamps indicate if the signal from the selected secondary station is received in the middle of the manually selected time period.

Figure 4:
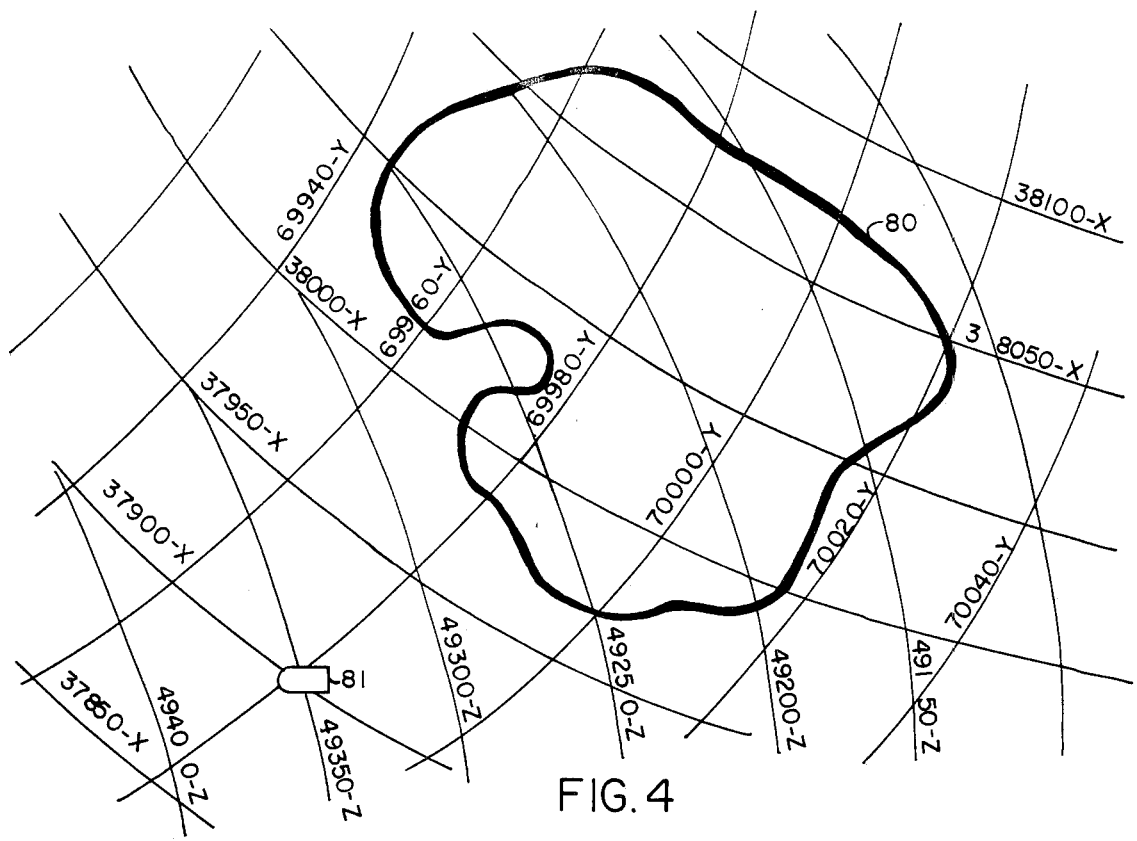
FIG. 4 is a representation of a portion of a LORAN-C navigation chart.

The six comparator stages represented by comparators 18 and 20 in FIG. 1 have one stage corresponding to each of the five decimal numbers which are found on the lines of position (LOP) of LORAN-C hydrographic chart as represented in FIG. 4 and an extra stage for interpolating between these LOPs. The operator of my novel LORAN-C receiver will manually enter the first two digits of a LOP number on the two higher order digit switches after consulting a LORAN-C hydrographic chart. Chance of error in selecting the first two numbers is small since the first two digits of LOP numbers are constant over long distances as may be seen on LORAN-C charts. Thus, the receiver operator is essentially not really guessing as to the first two digits and there is no need for latches or lamps associated with these first two higher order stages to indicate if the numbers are high or low. The remaining four stages, including digit switch 21 which is associated with the sixth or lowest order stage, have latches and lamps associated therewith. The remaining three switches, latches and lamps are not in FIG. 1, but are shown and described in detail elsewhere in the drawing and specification.

The four lowest order digit switches, including digit switch 21, with their associated comparators, latches and lamps are designed to operate sequentially. That is, upon a correct setting of the two highest order digit switches, including digit switch 19, the lamps, not shown, associated with the third highest order state must both be lit by their corresponding comparator, also not shown, before the comparator and lamp associated with the next lower order stage can be energized. This process continues as the receiver operator sequentially operates each of the four lowest order digit switches in decending order until all lamps on the receiver are lit indicating that the reading on the thumbwheel digit switches indicates a LOP upon which the receiver is located. At this time, the signals from the selected secondary station are received in the middle of a very short time period.

Gain control circuit 15 with its various inputs and outputs is used to control the gain level of receiver 10 at a first level when a master station pulse train is being received and at a second level when a secondary station pulse train is being received. Gain control circuit 15 is normally in its manual gain control mode, with the gain being set by the operator using Master Gain Control variable resistor R1 on the front panel of the receiver. The output of receiver 10 is coupled into gain control circuitry 15 wherein circuitry is included to determine if the gain for the master station is too high. When this condition occurs, the last mentioned circuitry lights the lamp LEVEL HIGH and the operator reduces the gain with resistor R1 until the lamp LEVEL HI is extinguished.

Briefly, circuit 15 switches gain control states as follows: Upon the pulse train received from a master station being stored in shift register 12, with the identifying ninth pulse being detected by logic circuit 14, circuit 14 provides an output to gain control circuit 15 which causes circuit 15 to switch to its automatic gain control mode for secondary stations and manual gain control determined by variable resistor R1 is disabled. As the next signal to be processed by the receiver will be from the selected secondary station, as determined by the settling of the two highest order thumbwheel switches, the feedback from receiver 10 to gain control circuit 15 provides automatic gain control to receiver 10 for the selected secondary station in a manner well known in the art.

Each time gain control circuit 15 receives an indication from logic/9 circuit 14 that the pulse train for the master station has been received, circuit 15 applies a signal to energize lamp LOCK for a predetermined period of time less than the group repetition rate for the LORAN-C chain. Successive pulse chains received from the master station cause gain control circuit 15 to cause successive energizing signals to be applied to lamp LOCK and this lamp will appear to remain lit indicating that the LORAN-C receiver has locked on to the master station.

As is well known in the art, when a secondary station of a LORAN-C chain is defective for some reason, the ninth pulse of the master station pulse chain for the particular LORAN-C chain is periodically deleted in a predetermined "blink" code to indicate to the user of a LORAN-C receiver which secondary station is defective. Blink information is found on the LORAN-C hydrographic charts so that the operator knows which station is defective. When the ninth pulse is blinked, gain control circuit 15 cannot energize lamp LOCK to keep the lamp in its illuminated state, but rather, the lamp is extinguished at the same "blink" code rate being transmitted by the master station.

DETAILED DESCRIPTION

In FIG. 2 is seen the shape or waveform of every pulse transmitted by both master and secondary LORAN-C stations. The waveform of this pulse is very carefully chosen to aid in the detection of the third carrier cycle zero crossing in a manner well known in the art. One method known in the art is to take the first derivative of the curve represented by the envelope of the pulse shown in FIG. 2, and this first derivative clearly indicates a point at 25 microseconds from the beginning of the pulse. The next zero crossing following this indication is the desired zero crossing of the third cycle of the carrier frequency. Similar to the prior art method just described, my novel LORAN-C receiver detects the third zero crossing for each pulse of the master station and each secondary station. The precise time difference of arrival measurements to be made utilizing a LORAN-C receiver are made by measuring from the third cycle zero crossing of the fifth pulse of the master station pulse train and the third carrier cycle zero crossing of the fifth pulse of the manually selected secondary station.

In FIG. 3 is shown a representation of the nine pulse and eight pulse signals transmitted by a master station and the secondary stations of a LORAN-C chain. The small vertical lines each represent a pulse waveform such as shown in FIG. 2. The height of the vertical lines represents the relative signal strength of the pulses as received at a LORAN-C receiver. It can be seen that the signal strength of the pulses from the master station and each of the secondary stations are not identical. Thus, there is a requirement in my LORAN-C receiver for different receiver gain levels for the master station and the selected secondary station.

It can be seen in FIG. 3 that the group repetition interval (GRI) is defined as the period between the first pulses of two consecutive master station pulse trains for a given LORAN-C chain. This information is found on standard LORAN-C hydrographic charts and is used to calibrate the oscillator in my novel LORAN-C receiver as will be described in greater detail further in this specification.

In a manner well known in the art, LORAN-C receiving equipment is used to measure the time difference of arrival between the pulse train from a master station pulse train and the pulse trains from two or more secondary stations associated with the master station. This time difference of arrival information is shown on FIG. 3 as $T_x$, $T_y$ and $T_z$.

In FIG. 4 is shown a representative figure of a LORAN-C hydrographic chart. On this chart are shown three sets of arcuate curves, each set of curves having a five digit number thereon and suffixed by one of the letters, x, y or z. The numbers directly correspond to the time difference of arrival information $T_x$, $T_y$ and $T_z$ shown in FIG. 3 and measured by a LORAN-C receiver. In FIG. 3 the particular secondary station with which a set of the arcuate curves is associated is indicated by the suffix x, y, or z after the numbers on the curves.

LORAN-C charts show land masses such as island 80 on FIG. 4. For an example, the operator of my LORAN-C receiver located on boat 81 near island 80 would measure the time difference of arrival information between the master station and at least two of the three secondary stations in the LORAN-C chain. The operator, in making a measurement with respect to the X secondary station would measure 379000 on the thumbwheel switches of my LORAN-C receiver. As can be seen in FIG. 4, the line of position (LOP) 379000 is shown passing through boat 81. In a similar manner, the operator would measure the time difference arrival information with respect to the Y secondary station and would come up with the number 699800 on the thumbwheel switches of the receiver. Again, the LOP for this receiver reading passes through boat 81. If the operator of the LORAN-C receiver measures the time difference of arrival information with respect to the Z secondary station the thumbwheel readings would show 493500 and the LOP for this reading also passes through boat 81. Thus, the operator can accurately fix the position of the boat 81 on the LORAN-C chart. From this position information on the map of FIG. 4, boat 81 may, for example, be accurately navigated toward harbor 82 of island 80.

It will be noted that the sample LORAN-C chart shown in FIG. 4 has only five digits on each LOP, but my LORAN-C receivers, has six digits. The lowest order or sixth digit is used to interpolate between two LOPs on the LORAN-C chart in a manner well known in the art. In the simple example given above, boat 81 is located exactly on three LOPs so no interpolation need be done to locate a LOP between those shown on the chart of FIG. 4. Thus, it should be noted that the six digit numbers obtained utilizing my equipment each included an extra zero suffixed to the end of the five digit LOP numbers shown on the LORAN-C chart. A sixth digit other than zero on the receiver would require interpolation between the LOP lines on the chart.

Figure 5A:
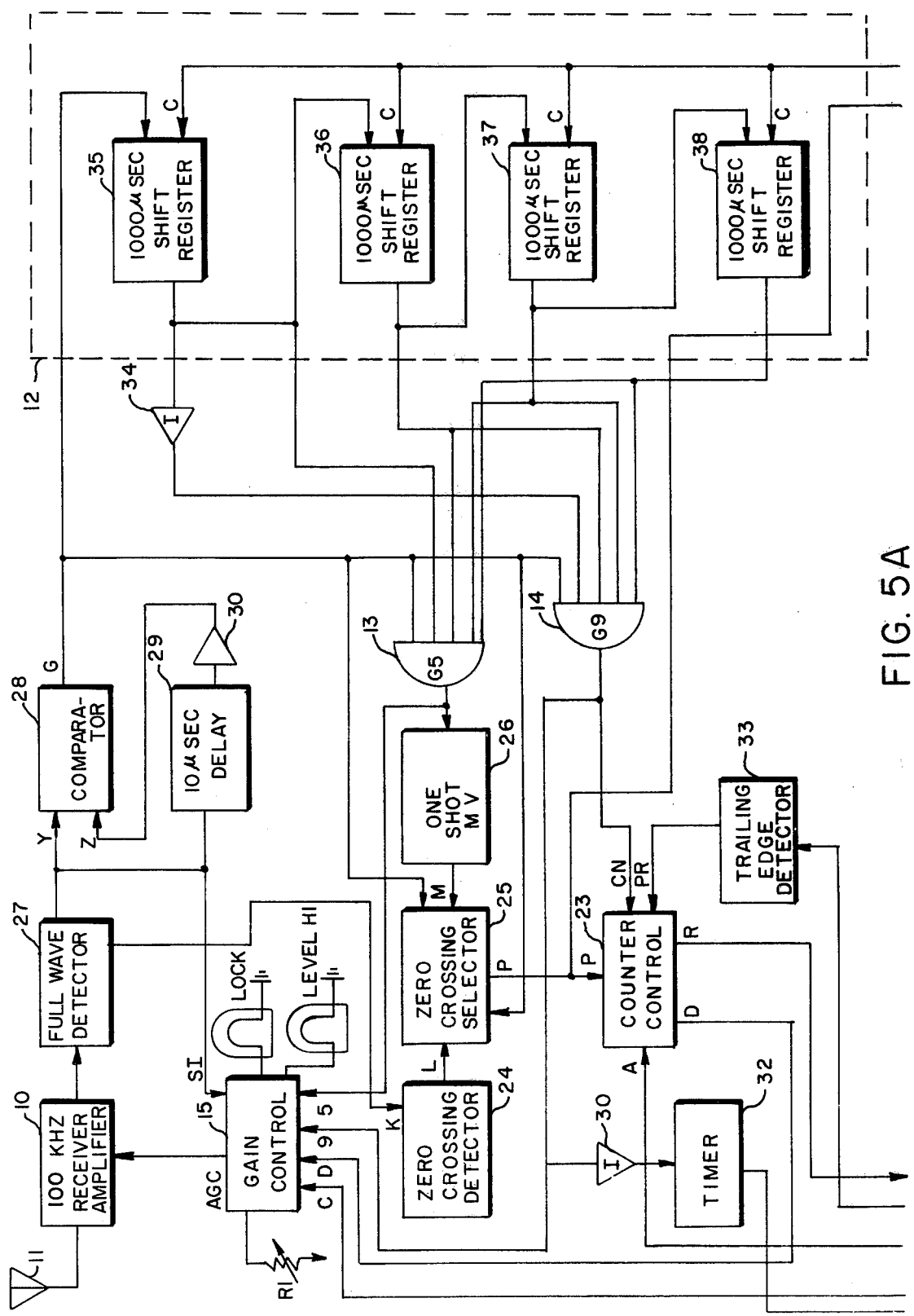
FIG. 5A is a detailed block diagram or schematic of part of the applicant's novel navigation receiver.
Figure 5B:
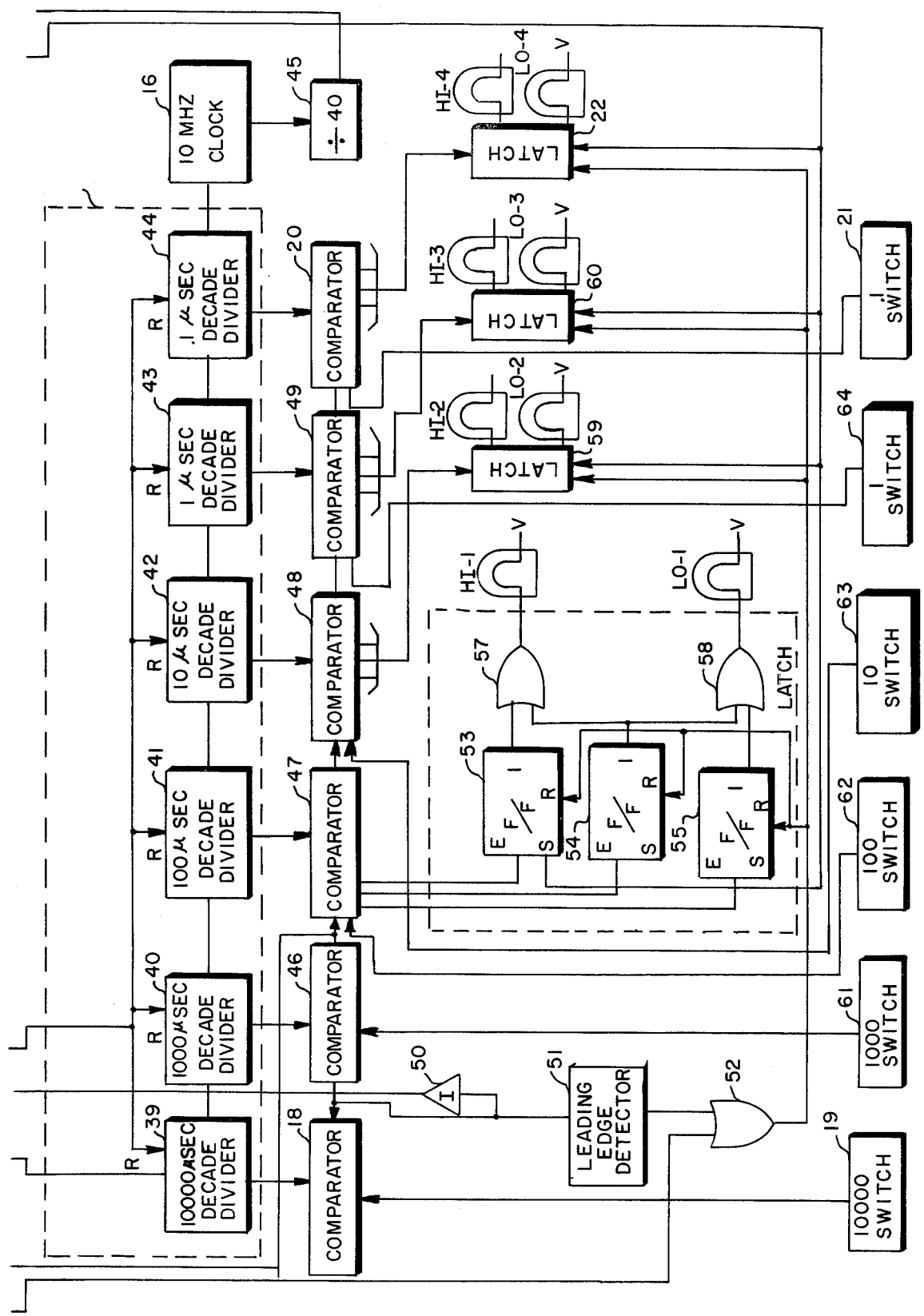
FIG. 5B is a detailed block diagram or schematic of part of the applicant's novel navigation receiver.

In FIGS. 5a and 5b is shown a detailed schematic of my novel LORAN-C receiver, which I will now describe in detail. FIGS. 5a and 5b must be arranged as shown in FIG. 10 to show the interconnections between the circuitry on FIGS. 5a and 5b.

LORAN-C signals are received by receiver/amplifier 10, which is of a conventional design, using antenna 11 in a manner well known in the art. Interference caused by miscellaneous radio frequency signals and signals from other navigational systems are essentially eliminated in that receiver 10 utilizes slot filters having a very narrow bandpass or slot and steep skirts to block most interference from my LORAN-C receiver. The received signals are coupled from receiver 10 to full wave detector 27 which is an absolute value detector and includes a low-pass filter. Detector 27 provides a full wave video envelope output. Receiver 10, being of a conventional design utilized in many LORAN-C receivers, is not disclosed in further detail herein. Similarly, full wave detector 27 is well known in the art and made up of a commercially available National Semiconductor LM 713 integrated circuits and other discrete components and is not disclosed further herein.

The video envelope output from detector 27 is input to four other circuits. It is applied to input Y of comparator 28, to ten microsecond delay circuit 29, to gain control circuit 15 at input SI, and to the K input of zero crossing detector 24. Comparator 28 is a standardly available National Semiconductor LM 710 high gain voltage comparator, and is used in conjunction with zero crossing detector 24 and zero crossing selector 25, as will be described further in this specification, to detect the third 100 Khz carrier cycle zero crossing previously described and shown in FIG. 2. To perform this function comparator 28 is used to provide an output at 25 microseconds plus or minus four microseconds from the beginning of each pulse such as shown in FIG. 1. The next zero crossing of the 100 Khz carrier is the desired 30 microseconds point. As previously mentioned, time difference of arrival measurements are made by measuring from the 30 microsecond zero crossing point of the fifth pulse of the master station pulse train and the 30 microsecond zero crossing point of the fifth pulse of the selected secondary station pulse train. To accomplish this, delay circuit 29 delays the video envelope output from detector 27 by ten microseconds, which is one full cycle of the carrier, and the delayed signal is then amplified by amplifier 30 before being applied to input Z of comparator 28 to be compared to the waveform input at the Y input. The delayed and amplified waveform applied to at input Z of comparator 28 has a point on its envelope where its amplitude is equal to the amplitude of a point on the unamplified envelope applied to input Y at comparator 28. This point occurs at the 25 microsecond plus or minus 4 microsecond point mentioned previously. Delay circuit 29 and amplifier 30 are factory adjusted and never need further adjustment in that delay circuit 29 is a LC delay line the value of the components of which vary insignificantly over the life of the LORAN-C receiver. Amplifier 30 is a commercially available high gain operational amplifier using high negative feedback to reduce the overall gain to between 1 and 2. With this large amount of negative feedback the adjusted gain of amplifier 30 also does not change appreciably over the life of the receiver.

The output from comparator 28 on lead G is a pulse which occurs at 25 microseconds plus or minus 4 microseconds from the beginning of each pulse of the pulse trains transmitted by the master and secondary LORAN-C stations. These pulses output by comparator 28 onto lead G are applied to (logic/5) AND gate 13, (logic/9) AND gate 14, zero crossing selector 25, and 1,000 microsecond shift register 35 in register 12.

It should be noted that the output from register 35 is applied to the input of shift register 36, the output of register 36 is applied to the input of shift register 37, and the output of register 37 is applied to the input of shift register 38. This interconnection of shift registers 35, 36, 37 and 38 comprises, in a manner well known in the art, a larger shift register. In this embodiment of my invention shift registers 35, 36, 37 and 38 are each 250 bit shift registers, so the four of them make up a 1,000 bit shift register. Each of shift registers 35, 36, 37 and 38 have a clocking input C which is derived from clock 16 and divider circuit 45 in FIG. 5b. Clock 16 operates at 10 megahertz and applies this frequency signal to divider circuit 45 which divides by 40 and therefore applies a 250 kilohertz signal to the clocking inputs C of the individual shift registers 35, 36, 37 and 38 within shift register 12. Thus, a signal applied to the input of any one of shift registers 35, 36, 37 and 38 will emerge from each of the individual shift registers 1,000 microseconds later. It is to be noted that this rate of passage of a pulse through each of the shift registers 35, 36, 37 and 38 is exactly equal to the rate at which pulses are received in a pulse train from the master or secondary LORAN-C stations.

More particularly, as each of the eight pulses, each spaced at 1,000 microseconds intervals, of the pulse trains that are transmitted by all master and secondary stations is received by my novel LORAN-C receiver, the pulses are shifted through the individual stages of shift register 12 and are tested by logic AND gate circuits 13 and 14 as now described. The first of the eight pulses output from comparator 28 on lead G is applied to shift register 35 and is also applied to one of the multiple input to AND gates 13 and 14. As the other inputs to gates 13 and 14 are not high, there is no output from gates 13 and 14 at this time. 1,000 microseconds later the second of the eight pulses received from a master or secondary station causes a pulse output from comparator 28 on lead G. At this precise moment in time, the first received pulse, which has been in the process of being shifted through shift register 35, appears at the output of this register. Thus, the first pulse being output from register 35 is applied to a second input of gate 13 while the second pulse, present on lead G, is supplied to the aforementioned first input to gates 13 and 14. Again, all the inputs to either gate 13 or gate 14 are not high at this time, and, accordingly, there is no output from either one of these gates. Upon the third LORAN-C pulse being received and being output as a pulse from comparator 28, the first received pulse has now been shifted through shift register 36 and is present at its output, while the second received pulse has been shifted through shift register 35 and is present at its output. Again, all the inputs to gates 13 and 14 are not high and there is no output from these gates. As the fourth pulse is output from comparator 28 on lead G, the first, second and third pulses have been shifted through shift registers 37, 36 and 35 respectively and are present at their respective outputs at this time. Again, a combination of the input leads to gates 13 and 14 is high but all inputs are not high so there is no output from these gates. 1,000 microseconds later the fifth pulse from a master or secondary station pulse train is being output from comparator 28 on lead G. At this precise moment in time, due to the shifting action of the individual registers within register 12, the first pulse is being output from shift register 38, the second pulse is being output from shift register 37, the third pulse is being output from shift register 36, and the fourth pulse is being output from shift register 35. It will be noted that at this time all the inputs to AND gate 13 only are high and there is an output from gate 13 to one shot multivibrator 26. All but one of the inputs to AND gate 14 is high at this time due to the action of inverter stage 34 at the output of shift register 35. Accordingly, there is no output from AND gate 14 at this time. Due to the fact that interference and noise at the 100 Khz carrier frequency of the LORAN-C chain should not occur as five pulses exactly spaced at 1,000 microsecond intervals, it is difficult for noise to enter my LORAN-C equipment and trigger an output from AND gate 13. Thus, only a valid pulse chain from a master or secondary LORAN-C station will cause an output from gate 13 indicating initially that a pulse train is being received from either a master or secondary station. As will soon be described, AND gate 14 is used to determine if the pulse train being received and operating shift register 12 is from a master station by looking for the characteristic spaced ninth pulse in a master station pulse train.

As the sixth, seventh and eighth pulses from either a master or secondary station are received, they are shifted into the individual shift registers stages of shift register 12. At the same time, the first, second and third pulses have been shifted out of the last shift register stage 38 and are lost as there are no further stages. Turning for a moment to FIG. 3, we should again note that the ninth pulse of a master station pulse train is spaced exactly 2,000 microseconds from the eighth pulse of the pulse train. Thus, upon the receipt of the ninth pulse and output thereof from comparator 28 on lead G, the sixth pulse is being output from shift register 38, while the seventh pulse is being output from shift register 37 and the eighth pulse is being output from shift register 36. Due to the absence of a pulse between the eighth and ninth pulses, which are spaced 2,000 microseconds apart, there is no output from shift register 35 at this time. The lack of an output from shift register 35 causes a low input to inverter stage 34 and thereby causes the output of inverter 34 to be high. It can be seen that at this time, due to the action of inverter 34, all the inputs to AND gate 14 are high and there is an output from this gate at this time. However, due to the lack of a pulse being output from shift register 35, one input to gate 13 is not high so there is no output from gate 13 at this time. Thus, an output signal from gate 14 indicates that the pulse train detected initially by gate 13 is from a master station rather than from a secondary station.

As the accuracy of my LORAN-C receiver depends upon accurately measuring the time difference between the third zero crossing of the fifth pulse of the master station pulse chain and the third zero crossing of the fifth pulse of the pulse train from a selected secondary station, it is imperative that the third carrier cycle zero crossing be accurately detected for the fifth pulses from the master and secondary stations. This is accomplished in the following manner in my novel equipment. The output from fullwave detector 27 is applied to the K input of zero crossing detector 24 which detects each positive going zero crossing of the 100 Khz carrier cycle of each pulse in the pulse trains from the master and secondary stations. Detector 24 applies a signal via lead L to zero crossing selector 25 for each of these zero crossings.

Upon shift register 12 and AND gate 13 cooperating as previously described to provide an output indicating the fifth pulse in a pulse train from a master or a secondary station, there is an output from gate 13 to energize one-shot multivibrator 26 which produces a timed output pulse of 6,000 microseconds duration that is applied to input M of zero crossing selector 25. Also as previously described, the output from comparator 28 on lead G to selector 25 occurs at 25 microseconds ± four microseconds from the beginning of each detected pulse. Zero crossing selector 25 is jointly responsive to the signal input thereto directly from comparator 28 and starting immediately prior to the desired third zero crossing of each pulse, and to the leading edge of the 6,000 microsecond pulse generated by one-shot multivibrator 26 indicating the presence of the fifth pulse, and to the indication from zero crossing detector 24 of a positive going zero crossing, to generate a signal of its output lead P starting at precisely the 30 microsecond third zero crossing point which is shown in FIG. 2.

Summarizing, zero crossing selector 25 provides an output pulse on its lead P for the desired zero crossing of the third cycle of the carrier frequency of the fifth pulse of a master or secondary LORAN-C station. This signal on lead P is input to counter control 23 and used to start counter/divider 17 in FIG. 5b to accurately measure the time difference of arrival between the third zero crossing of the fifth pulse of the pulse train from a master station and the third zero crossing of the fifth pulse of the pulse train from the selected secondary station.

Before continuing with a description of the operation of counter control 23, turn to counter/divider 17 shown in FIG. 5b. Counter/divider circuit 17 can be seen to be made up of decade divider circuits 39, 40, 41, 42, 43 and 44 which are individually known and cooperate in a manner well known in the art. Counter 17 is driven by 10 megahertz clock 16 which inputs a 10 megahertz pulse train to counter 17 for the entire period that my novel LORAN-C receiver is energized. However, counter 17 is not enabled to count all the time as the reset input R of the individual divider stages 39 through 44 are utilized to keep counter 17 disabled during specific periods of time as is now described.

It can be seen that the reset inputs R of divider circuits 39 through 44 are all connected to the R output of counter control 23 in FIG. 5a, and the output of the 10,000 microsecond divider 39 is applied to input A of counter control 23. Other outputs from the individual divider stages 39 through 44 are applied to corresponding comparators 18, 46, 47, 48, 49 and 20 as shown. These outputs from the divider stages 39 through 44 to the last mentioned comparators is in BCD Code format.

Returning now to the description of counter control 23. In response to the leading edge of the signal on input P which indicates the appropriate third zero crossing of the fifth pulse of the pulse train from either a master or secondary station, control 23 removes an inhibiting signal from its output R which allows decade dividers 39 through 44 to start counting from a zero count state in response to the 10 megahertz signal from clock 16, in a manner well known in the art. If the pulse at input P to counter control 23 was due to a fifth pulse of a secondary station, rather than the fifth pulse from a master station, there will be no continual signal from gate 14 indicating the presence of a master station ninth pulse, and 10,000 microseconds after the start of counting there will be an output from decade divider 39 to input A of counter control 23 causing counter control 23 to apply a signal to output lead R to inhibit all of decade dividers 39 through 44 from counting and to reset them to their zero state. This is done because it is not desired to make a time difference of arrival measurement starting with receipt of a signal from a secondary station.

If, responsive to a master station pulse train, a start pulse from zero crossing selector 25 is applied to input P of counter control 23, 5,000 microseconds after the start of counting the master station ninth pulse will cause a signal to be output from gate 14 to input CN which tells counter control 23 to let counter/divider 17 continue counting. A subsequent inhibit signal at input A of counter control 23 due to decade divider 39 will then be ignored.

As previously described, counter/divider 17 in FIG. 5b is enabled to commence counting upon detection of the third zero crossing of the fifth pulse of each master and secondary station pulse train. However, if the pulse train is not from a master station, counter/divider 17 is reset and all its individual stages 39–44 are reset to zero. Upon the determination that the enabling pulse is from a master station, counter control 23 allows counter 17 to continue counting.

As will now be described, detection of the appropriate zero crossing of the fifth pulse of the selected secondary station does not stop counter/divider 17 from counting, but rather the contents of counter/divider 17 at that moment in time are compared with the settings of the associated thumbwheel switches 19, 61 to 64 and 20 by comparators 18, 20 and 46–49 and the comparison results are stored in latches as will be described further in this specification.

As previously described, the operator of my novel LORAN-C receiver makes an intelligent guess as to the first two digits of the time difference of arrival information after consulting a LORAN-C hydrographic chart for the area within which the LORAN-C receiver is located. For example, the operator would consult the LORAN-C chart shown in FIG. 4 and upon a determination that he will measure the time difference of arrival information between the master station and X the secondary station, the operator knows that the first two digits of the time difference of arrival information should be 37. The digit three is then entered on decimal thumbwheel switch 19 in FIG. 5b, and the number seven is entered onto the decimal thumbwheel switch 61. Upon decade divider 39 reaching the count of three, comparator 18 detects the equality between the count three being input from divider 39 and input from thumbwheel switch 19 and provides a high output indicating same. The high output from comparator 18 enables comparator 46 to subsequently indicate the equality of the contents of divider stage 40 and thumbwheel switch 61 within the immediately following 1,000 microseconds period.

The output of comparator stage 18 is also connected to leading edge detector 51 and is connected via inverter 50 to trailing edge detector 33 in FIG. 5a. As will be described in greater detail further in the specification, leading edge detector is used to place latches 56, 59, 60 and 22 in a reset state, thereby enabling these latches to thereafter store the comparison decision output of a corresponding one of comparators 47, 48, 49 and 20. Trailing edge detector 33 detects when the output of comparator 18 goes low indicating that there is no longer a match between the contents of decade divider 39 and thumbwheel switch 19. In the particular example being described herein, the decimal three was entered onto switch 19, so when decade divider 39 reaches the count of four the output of comparator 18 goes low. This occurs after the time difference of arrival measurement has been made, so does not interfere with the operation of other circuitry in my receiver. More particularly, when the output of comparator 18 goes low this transition is detected by trailing edge detector 33 which applies a signal to input PR of counter control 23 which responds thereto to energize output R stopping counting and resetting all the decade divier stages of counter/divider 17 to zero. This occurs prior to the receipt of the next pulse train from the master station so it prepares counter/divider 17 for this event.

Comparators 18, 20 and 46 through 49 are commercially available Fairchild 924 5-bit comparators. These comparators have two sets of binary coded decimal (BCD) inputs as previously described and have three outputs. Only one of these three outputs can be energized at any single time. The first output indicates if one of the two inputs is numerically higher than the other input, while the second input indicates if the second input is numerically lower than the second input, and the third output indicates if the two inputs are numerically equal. These three outputs are shown as the three leads from each of comparators 47, 48 49 and 20 and going respectively to latch circuits 56, 59, 60 and 22. These last named latch circuits are used to store one of the three comparator outputs at the moment in time that the third zero crossing of the fifth pulse from the selected secondary LORAN-C station is received.

As latches 56, 59, 60 and 22 are all identical, only the details of latch 56 are shown in detail in FIG. 5b. Latch 56 includes flip-flops 53, 54 and 55, OR gates 57 and 58, and LED lamps HI-1 and LO-1 which are on the front panel of my LORAN-C receiver and used to indicate to the operator of the receiver when the manual settings of switches 62, 63, 64 and 21 indicate the correct time difference of arrival information. Flip-flop 53 is used to store the indication from comparator 47 that a setting of switch 62 is too high, while flip-flop 54 is used to store the output from comparator 47 that the setting of switch 62 is correct, and flip-flop 55 is used to store the output from comparator 47 indicating that the setting of switch 62 is too low. That is, the information stored on flip-flop 53 is the output from comparator 47 that indicates that the decimal number keyed up on switch 62 is numerically higher than the number in decade divider stage 41. Flip-flop 54 is used to store the information from comparator 47 that the number setting of switch 62 is numerically equal to the number in decade divider 41, and flip-flop 45 is used to store the output information from comparator 47 that the number setting of switch 62 is lower than the number appearing in decade divider 41.

While three outputs have been described from comparators 47, 48, 49 and 20 to the associated latches 56, 59, 60 and 22, a fourth output is shown in FIG. 5b from one comparator stage to the next comparator stage. This fourth output is not really such, but is shown in this way for ease of representing the invention. This output coupling the various comparators stages is actually one of the three outputs previously described and, in particular, is the output which indicates that the numerical setting of the decade of the associated decade divider equals the numerical setting of the associated switch.

Turning now to describe how the circuitry of latch 56 functions. As mentioned briefly heretofore, the output of comparator 47 at the moment in time that the third zero crossing of the fifth pulse of the selected secondary station is detected is stored on one of the three flip-flops 53, 54 or 55. This information is stored on one of these three flip-flops until within 1,000 microseconds of the time that a subsequent fifth pulse of the selected secondary station is received. In this manner information is stored on flip-flops 53 to 55 most of the time and is cleared only briefly for updated storage. This is done because the outputs of flip-flop 53 to 55 and gates 57 and 58 provide the signals which are used to light LED lamps HI-1 and LO-1 and by this mode of operation these lamps will not flicker. The brief 1,000 microsecond or less period that flip-flop 53 to 55 are cleared is insufficient for lamps HI-1 and LO-1 to extinguish before being re-energized by the flip-flops.

In the event that flip-flop 53 is placed in its one state to store the signal from comparator 47 indicating that the decimal number manually placed on switch 62 is numerically higher than the number in decade divider 41, the one output of flip-flop 53 is high. The high output from flip-flop 53 is passed through OR gate 57, which also serves as a driver, to energize lamp HI-1. Lamp HI-1 alone being lit indicates that the number setting of thumbwheel switch 62 is too high, and the LORAN-C receiver operator must manually reset switch 62 to a lower number. Similarly, when flip-flop 55 is placed in its one state indicating that the numerical setting of switch 62 is lower than the numerical contents of decade divider 41, the output of flip-flop 55 is high and is applied via OR gate 58 to ligh only lamp LO-1. Lamp LO-1 alone being lit indicates to the operator that the numerical setting of switch 62 is too low and the switch must be manually changed by the operator to a higher number. Finally, when comparator 47 indicates that the numerical values of the setting of switch 62 and the contents of divider 41 are equal, flip-flop 54 is placed in its one state and its output is applied via both OR gate 57 and 58 to concurrently light lamps HI-1 and LO-1. The concurrent lighting of lamps HI-1 and LO-1 tells the operator that the setting of switch 62 is correct.

As mentioned briefly heretofore, the fourth output from each of the comparators 18 and 46–49 to the next subsequent comparator stage is used to enable the next subsequent stage to perform its comparison function. In this manner, the lamps associated with latches 56, 59, 60 and 22 will not be lit until the settings of the thumbwheel switches 19 and 61 are correct. Similarly, both lamps HI-1 and LO-1 of latch 56 will both have to be lit indicating an equality comparison by comparator 47, before comparator 47 enables comparator 48 to function and one, the other or both of lamps HI-2 and LO-2 can be lit. In this manner, the operator of the receiver does not see the LED lamps associated with latches 59, 60 and 22 turning on and off while he is operating switch 62 to light both lamps HI-1 and LO-1 of latch 56.

In summary, the operator, after consulting a LORAN-C chart, enters the two highest order time difference of arrival digits onto thumbwheel switches 19 and 61. If the digits entered onto switches 19 and 61 are correct, one, the other or both of lamps HI-1 and LO-1 of latch 56 will be lit and the operator will manually operate switch 62 until both of these lamps are lit. Next, one the other or both of lamps HI-2 and LO-2 will be lit and the operator will manually operate switch 64 until both of these lamps are lit. Thereafter, one, the other or both of lamps HI-3 and LO-3 will be lit and the operator will manually operate switch 64 until both of these lamps are lit. Finally, comparator 20 will be enabled and one, the other or both of lamps HI-4 and LO-4 will be lit and the operator will operate switch 21 until both of these lamps are lit. With all eight lamps being lit, the operator knows that the exact time difference measurement has been made and takes the six digit decimal number of thumbwheel switches 19, 61 to 64 and 21 and finds or interpolates to the appropriate line of position (LOP) on the LORAN-C chart. For example, with reference to FIG. 4, if the operator was making the measurement with respect to the X secondary station, the reading on switches 19, 61 to 64 and 21 would be 379000. It will be noted in FIG. 4 that this line of position goes through boat 81. As previously described, the last or sixth digit is used to interpolate between LOPs shown on a LORAN-C chart.

Thereafter, the operator will utilize the LORAN-C receiver to find the LOPs for one, the other or both the Y and Z secondary stations. With respect to the Y secondary station the reading on switches 19, 61 to 64 and 21 will be 699800, and with respect to the Z secondary station the reading on these same switches will be 493500. It can be seen that all these lines of position intersect at boat 81 in FIG. 4.

As mentioned previously, latches 56, 59, 60 and 22 are cleared out within 1,000 microseconds before receipt of the fifth pulse of the pulse train from the selected secondary station and new comparison information is stored in these latches by the associated comparators. To perform this function the two time difference of arrival digits placed on switches 19 and 61 will result in a comparison equality output from comparator 18 and thereafter comparator 46 as previously described. Upon the output of comparator 18 going high this transisition is detected by leading edge detector 51 which provides an output through OR gate 52 which is applied to the reset input of latches 56, 59, 60 and 22. As shown in representative latch 56, this reset input is applied to the reset inputs of flip-flops 53, 54 and 55 to clear these flip-flops. Similarly, flip-flops (not shown) in latches 59, 60 and 22 are reset. Within the following 1,000 microsecond period, which is a time period equal to the duration of a single pulse, the third zero crossing of the fifth pulse of the selected secondary station will be detected and will result in an output from zero crossing selector 25 on lead P. It should be noted that one branch of the output on lead P goes to the lower right hand corner of FIG. 5a and then is input to the set inputs of latches 56, 59, 60 and 22 in FIG. 5b. It can be seen in latch 56 that this set input goes to the set inputs S of flip-flops 53 to 55. Upon a signal appearing on the set inputs S of latches 56, 59, 60 and 22, whatever one of the three inputs is energized from the associated comparators and applied to the enable input E of flip-flops 53 to 55 will be stored in the corresponding one of the three flip-flops upon the appearance of the set signal. Thereafter, flip-flops 53 to 55 will not respond to any of the signals output from comparator 47 and applied to the E inputs. Similarly, the flip-flops (not shown) within latches 59, 60 and 22 are placed in their set states at the same time. Shortly after the time within which the fifth pulse of the selected secondary station will be received, the count in divider 39 will be incremented by one and will at that time be numerically larger than the digit placed on thumbwheel switch 19. The output of comparator 18 to comparator 46 will go low and will be passed via inverter 50 to trailing edge detector 33 in FIG. 5a. When the output of comparator 18 goes low, inverter 50 causes the input to trailing edge detector 33 to go high which is detected by detector 33. In response thereto, detector 33 applies a signal to the PR input of counter control 23 which responds by energizing its output lead R to reset the various stages of counter/divider 17 as previously described. In this manner counter/divider 17 is cleared to zero and is prepared to be triggered by the next received pulse train.

Returning now to FIG. 5a to describe the operation and function of gain control circuit 15. As pointed out with reference to FIG. 3, signals being received from master stations and each of the secondary stations will be received at different signal strengths or amplitudes. Thus, for example, master station pulse trains may be received at very high levels while the pulse train from a selected secondary station may be received at very low levels. Gain control circuit 15 is utilized to switch the gain of 100 Khz receiver amplifier 10 between two levels to provide for the proper reception of the signals from this master station and secondary station. More particularly, gain control circuit 15 is placed in an automatic gain control mode for secondary station signals and is placed in a manual gain control mode for master station signals. For the automatic gain control mode, the output of fullwave detector 27 is connected to the SI input of gain control 15 which samples and stores the feedback signal at input SI and automatically provides a gain control signal to receiver/amplifier in a well known manner.

As previously described, the fifth pulse of both master and secondary stations causes an output from AND gate 13 in FIG. 5a. One output of this gate is applied to input 5 of gain control circuit 15. Another input C of gain control circuit 15 comes from the output of the second stage comparator 46 in FIG. 5b and this output of comparator 46 only goes high immediately prior to receipt of the fifth pulse of the selected secondary station. With inputs C and 5 to gain control circuit 15 being high, gain control circuit 15 is switched to its automatic gain control mode where it samples the output of fullwave detector 27, stores the sample, and automatically provides a gain control signal to 100 Khz receiver/amplifier 10. Upon the termination of the output from comparator 28 on lead G, the output of AND gate 13 goes low causing the 5 input of gain control circuit 15 to go low. Gain control circuit 15 therefore becomes nonresponsive to the signal appearing at input SI. Control circuit 15 continues to provide automatic gain control to receiver/amplifier 10 until the output of comparator 46 on FIG. 5b goes low thereby causing input C to control circuit 15 to go low.

Gain control circuit 15 provides a different gain control signal to receiver/amplifier 10 when a master station signal is being received. Control circuit 15 goes into this master station gain control mode when its inputs 9 and D are high. As previously described, the output of AND gate 14 is high upon the detection of the ninth pulse of a master station pulse train, and the D input goes high under control of counter control 23 which makes its D output go high immediately upon the indication at its input P of the third carrier cycle zero crossing of the fifth pulse of the master station. During this period that gain control 15 is in its master station gain control mode, variable potentiometer R1 is connected to receiver/amplifier 10 to set the gain level thereof. Potentiometer R1 is located on the front panel of my LORAN-C receiver and is entitled Master Gain Control. In the event that the gain signal applied to receiver/amplifier 10 in response to the manual setting of potentiometer R1 is too high, other circuitry within gain control circuit 15 causes lamp LEVEL HI to be lit. The operator then turns potentiometer R1 until lamp LEVEL HI is extinguished.

When input C of gain control circuit 15 is sequentially and consistently energized in response to the receipt of every fifth pulse of the periodic pulse train generated by the selected secondary station, gain control circuit 15 generates periodic signals that cause lamp LOCK to be remain lit. Lamp LOCK indicates to the operator of the LORAN-C receiver that the circuitry is working properly and is properly measuring the time difference of arrival information between the master station and a selected secondary station.

As is well known in the art the Coast Guard selectively blocks the transmission of or "blinks" the ninth pulse of the master station in a predetermined code pattern to indicate which secondary stations in the LORAN-C chain are defective and should not be utilized by operators of LORAN-C equipment to make measurements. When the ninth pulse is not generated, counter 17 in FIG. 5b is not allowed to function to the point where comparator 46 can cause input C of gain control circuit 15 to go high. Thus, gain control circuit 15 blinks the LOCK lamp in direct correspondence with the master station blinking the ninth pulse. In this manner the operator of my LORAN-C receiver also knows which secondary stations are defective upon viewing the blink code and consulting the LORAN-C chart upon which the designations of the blink codes are listed.

Figure 6:
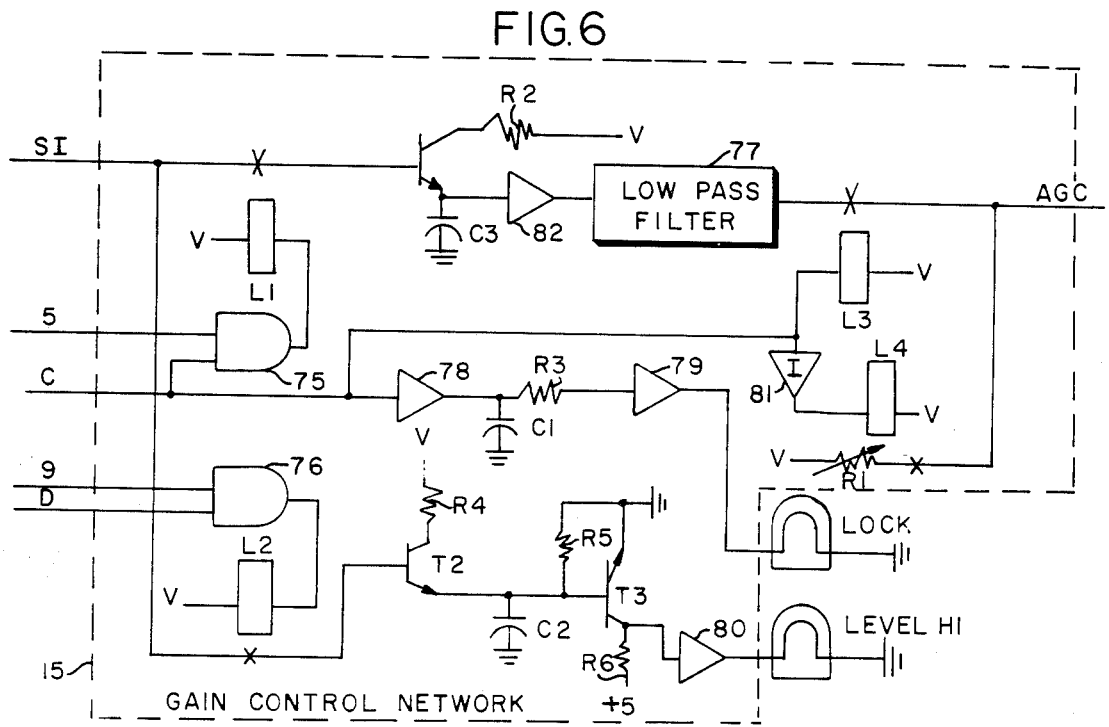
FIG. 6 is a schematic diagram of the gain control circuit within the applicant's navigation receiver.

FIG. 6 shows a detailed schematic of the gain control network 15 which is only shown in block diagram form in FIG. 5a. The input and output lead designations of gain control network 15 shown in FIG. 6 are the same as those shown in FIG. 5a and just described. As described previously, the pulse waveform signal output from fullwave detector 27 is applied to input SI of gain control network 15. It can be seen that the signal at input SI is either connected via the contact of relay L1 to circuitry including transistor T1 or is connected via the contact of relay L2 to circuitry including transistor T2. Relays L1 as well as relay L3 are operated only in the secondary station automatic gain control mode, whereas relay L2 as well as relay L4 are operated only in the master station manual gain control mode. By the action of AND gate 75 it can be seen that relay L1 is operated upon inputs 5 and C concurrently being high, whereas relay L3 is operated only upon input C is high. As previously described input 5 is high upon the detection of the fifth pulse of the master station and secondary stations pulse trains, but input C is high only for the selected secondary station. As input C is high in the order of 100 microseconds prior to the detection of the third zero crossing of the fifth pulse of the selected secondary station, relay L1 can only be operated by the action of logic gate 75 at the same time that input C goes high. The C input only remains high for a few hundred microseconds and during this period the signal output of detector 27 is applied to the base terminal of transistor T1 which, in conjunction with capacitor C3, stores the waveform sample applied to the base terminal T1 during the short period that relay L1 is operated. Capacitor C3 holds its waveform sample because transistor T1 is then turned off and amplifier 82 has a high input impedance. The signal sample stored on capacitor C3 is amplified and passed through lowpass filter 77, the contact of relay L3 and lead AGC to receiver/amplifier 10 to adjust the gain level of receiver/amplifier 10 during the period that the secondary signals are being received as previously described.

Due to the action of inverting amplifier 81 one of relays L3 or L4 is operated at all times. Thus, when the C input of gain control network 15 is high relay L3 is operated and relay L4 is unoperated. Following receipt of the signals from the selected secondary station and the desired time difference of arrival measurement being made, input C goes low causing relay L3 to return to its unoperated state and causing relay L4 to operate. The contact of relay L4 causes potentiometer R1 to be connected to AGC lead to receiver/amplifier 10. The manual setting of potentiometer R1 causes a potential dependent upon its setting to be coupled via lead AGC to receiver/amplifier 10 to set the gain thereof.

As previously described, input D of gain control network 15 goes high immediately upon the detection of the third cycle zero crossing of the fifth pulse of the master and secondary station pulse trains. When input D is high in response to the fifth pulse of a master station pulse train, input 9 will also be high as previously described. This causes the output of AND gate 76 to go high and operate relay L2. The contact of relay L2 causes the master station fifth pulse signal present at input SI of network 15 to be coupled to the base terminal of transistor T2. Transistors T2 and T3 along with their associated components store the master station fifth pulse sample on capacitor C2 and determine if the gain of receiver/amplifier 10 is too high. In the event that the master station level is too high, the signal sample stored on capacitor C2 causes transistor T3 to conduct more and the potential across collector resistor R6 is then sufficient to cause amplifier 80 to light lamp LEVEL HI. The operator would then use potentiometer R1 (MASTER GAIN CONTROL) on the front panel of my LORAN-C receiver to reduce the gain level and extinguish LED lamp LEVEL HI.

Although, in the detailed description of gain control network 15 immediately herein above, I described relays L1, L2, L3 and L4 with associated contacts, they are not electromechanical relays but were merely described in this manner for easy understanding of the function of gain control network 15. In reality a commercially available Fairchild CD 4066 integrated circuit switch was used. This integrated circuit contains four single-throw electronic switches which provide the function described.

Figure 7:
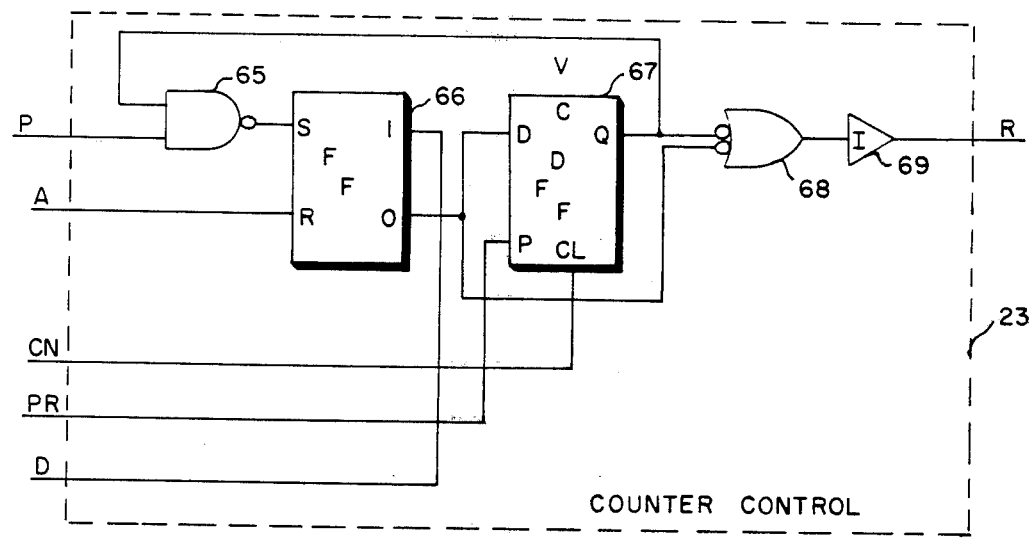
FIG. 7 is a schematic diagram of the counter control circuit within the applicant's navigation receiver.

Counter control 23 is shown in detailed schematic form in FIG. 7 and operates as follows. Initially, flip-flop 66 is in its zero state and flip-flop 67, which is a Texas Instruments 7474 flip-flop, has its Q output high. The zero output of flip-flop 66 and the Q output of flip-flop 67 are applied to the inverted inputs of OR gate 68, so the output of this gate is low. Due to the operation of inverter 69, however, the signal on output lead R is high. As previously described, the signal on lead R is applied to the reset inputs of the various stages of counter/divider 17 as shown in FIG. 5b and a high signal on lead R keeps counter/divider 17 from counting. Also as previously described, there is a pulse on input lead P of counter control 23 for the third cycle zero crossing of the fifth pulse of all master and secondary station pulse trains. As can be seen, one of the two inputs of AND gate 65 is connected to the Q output of flip-flop 67 which is initially in its high state. With a signal present on input lead P, both inputs to AND gate 65 are high and the output thereof goes high causing flip-flop 66 to be placed in its set state. In this set state the one output of flip-flop 66 goes high while the zero output of flip-flop 66 goes low. The high signal present at the 1 output of flip-flop 66 is applied to lead D to be input to gain control circuit 15. The signal on lead D, in conjunction with an output signal from AND gate 14 detecting the master station ninth pulse, places gain control circuit 15 in its master gain control mode.

With the zero output of flip-flop 66 now being low, the D input of flip-flop 67 is also low and this causes the Q output of flip-flop to be low. At this time, both inputs of OR gate 68 are low and due to the action of the inverted input the output of OR gate 68 is high. Due to the action of inverter 69 the signal on lead R goes low allowing counter/divider 17 in FIG. B to count as previously described.

Two events can happen at this time; counter control 23 can receive a continue signal on lead CN which allows counter/divider 17 to continue counting and make a time difference measurement between the signals from a master station and a selected secondary station, or an abort signal is received on input lead A to counter control 23 which causes counter/divider 17 to be reset to zero. This latter operation occurs when the start signal on input lead P is due to the fifth pulse from a secondary station rather than a master station as previously described.

In the event that the fifth pulse start signal present on input lead P is from a master station, there will be an output signal from AND gate 14, which detects the presence of a master station ninth pulse, and this signal is the continue signal which is applied to input lead CN. The signal on lead CN is applied to clocking input CL of flip-flop 67 in counter control 23 and causes flip-flop 67 to remain in its present state which, at this point in time, is with its Q output low. Thus, counter/divider 17 in FIG. 5b is allowed to continue counting as already described. Thereafter, after the time difference measurement has been made in my LORAN-C receiver, there is a signal present on lead PR, as previously described, that indicates that the measurement has been completed. This completion signal present on lead PR is applied to preset input P on flip-flop 67 and causes this flip-flop to return to its initial state with its Q output high. This causes counter/divider 17 to stop counting and to have its various stages reset to zero as already described.

If, prior to a continue count signal being received on lead CN, an abort signal is received on input lead A of counter control 23, indicating that a master station ninth pulse has not been received, this abort signal being applied to the reset input R of flip-flop 66 causes this flip-flop to change to its zero state and its zero output is thereby caused to go high as previously described. As a final consequency counter/divider 17 is reset to zero as previously described.

Figure 8:
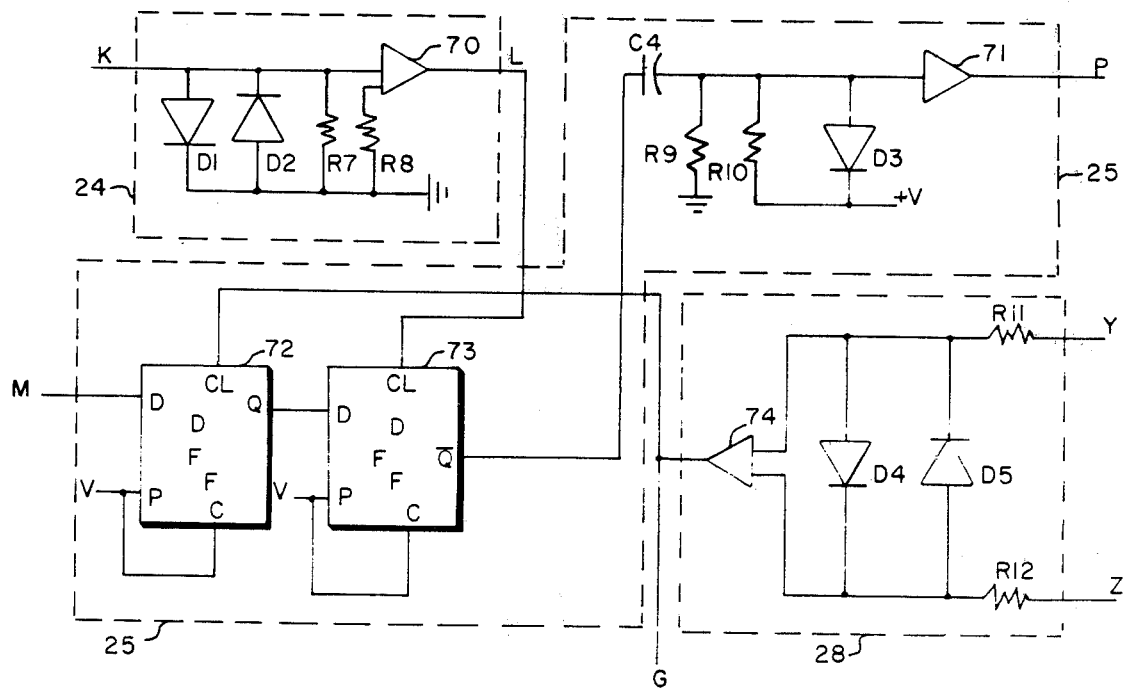
FIG. 8 is a schematic diagram of the zero crossing detector, zero crossing selector, and crossover comparator in the applicant's navigation receiver.

In FIG. 8 are shown detailed schematics of comparator 28, zero crossing detector 24, and zero crossing selector 25, the operation of all of which were generally described heretofore. The components of comparator 28 cooperate in a well known manner in response to the signal at input Y, and to the delayed and amplified version of the same signal applied to input Z, to apply an output signal on lead G of a duration of approximately fifty microseconds at a point in time 25 microseconds, plus or minus four microseconds after the beginning of each and every pulse (FIG. 2) from all master and secondary stations. As previously described, the desired third zero crossing of the carrier of the pulses occurs immediately after the beginning of the pulse on output lead G so the signal output on lead G is used to locate the third zero crossing as is described in detail hereinafter.

Zero crossing detector 24 has an input K upon which the pulse signals are received from detector 27. Components making up detector 24 cooperate in a manner well known to provide an output signal on lead L for every positive going zero crossing of each cycle of each pulse transmitted by the master and secondary stations. As is recognized, only the third positive going zero crossing must be detected and this accomplished by zero crossing selector 25 as will not be described.

Zero crossing selector 25 has an input to flip-flop 73 from zero crossing detector 24 as shown. A second input to selector 25 is from comparator 28 as shown, and finally the third input to selector 25 is the 6,000 microsecond pulse on lead M starting with the third zero crossing of the fifth pulse of each master and secondary station pulse train. Upon the concurrence of the 6,000 microsecond pulse from one-shot multivibrator 26 starting at 25 microseconds plus or minus 4 microseconds from the beginning of the fifth pulse of the pulse trains from the master and secondary stations, and the signal from comparator 28, there will be a signal on output Q of flip-flop 72 to the D input of flip-flop 73. A signal on input D of flip-flop 73 along with the signal applied to the clocking input thereof from zero crossing detector 24 indicating every positive going zero crossing of each pulse, there will be an output from flip-flop 73 at its $\bar{Q}$ output. This output is applied to a differentiator made up of resistors R9 and R10, diode D3, capacitor C4 and amplifier 71 to provide a very short pulse on output lead P from zero crossing selector 25 starting at the third positive going zero crossing of each fifth pulse of the pulse trains transmitted by the master and secondary stations. This is used to drive counter control 23 as described elsewhere in this specification.

As previously described in this specification the LORAN-C transmitters operate using cesium frequency standard clocks to provide position location accuracy within two hundred feet. It was also pointed out that inaccuracies in measuring the time difference of arrival of signals from the master and secondary stations result in position determination errors. Accordingly, it is recognized that the internal oscillator of the receiver used to make the time difference of arrival measurements must be in calibration to provide the required position determination accuracy. In the prior art, this required taking the LORAN-C receiver to a central repair facility for calibration. In addition, to maintain calibration, complex oscillator circuits usually mounted in temperature controlled ovens are required. In my novel LORAN-C receiver oscillator or clock 16 is easily calibrated by the receiver operator to achieve the accuracy of the cesium frequency standard used by the Coast Guard for the LORAN-C transmitters. The operator of the receiver uses the thumbwheel switches to select a time window only within which received signals will be recognized. In normal operation this window is left open for 1,000 microseconds and narrowed around a selected received signal as previously described.

In accordance with the method taught by my invention, in the calibration mode the exact time of arrival between master station signal pulse trains is known and is called the Group Repetition Interval (GRI) which is found on the LORAN-C charts. The receiver operator sets the thumbwheel switches to this GRI and this sets the narrow window only within which a subsequent received master station signal pulse train can be received. When the clock 16 is properly calibrated, a subsequent received master station pulse train will be received within the time window. If the clock 16 requires calibration, the master station pulse train will not be received within the selected time window. The front panel calibration is then manipulated by the receiver operator until the master station pulse train is received within the GRI selected time window, as indicated by all front panel lamps being lit as described in detail elsewhere in this specification.

Adjustable, stable oscillator circuits are well known in the art and many of these may be used with my invention of the method of calibration against the transmitter GRI. Accordingly, no specific oscillator circuit is disclosed in detail herein.

While that which has been described hereinabove is at present considered to be the preferred embodiment of the invention, it is illustrative only, and the rapid changes in technology will soon make various changes and modifications obvious to those skilled in the art without departing from the scope of the invention as claimed below.

For example, it would be obvious to modify the gain control circuitry in an obvious manner to make the master and secondary stations gain control both automatic or both manual. In addition, it would be obvious to use an integrated circuit microprocessor to automatically accomplish the time difference measurement of the four lower order thumbwheel switches disclosed herein after the two higher order digits are manually entered. Further, there are several alternate ways known in the art to detect the third zero crossing of the received pulses of which only one is disclosed briefly in the specification.

It would also be obvious to store the output of the counter and switch comparators on the flip-flops of the latches, rather then clearing them once per group repetition interval to account for the receiver losing lock. The comparison information obtained when the receiver was in lock would be left in the latch flip-flops indefinitely or for a predetermined period when the receiver is out of lock and would only be updated when the receiver reestablishes its lock state. In this manner the HI- and LO- LED lamps display will not flicker when the receiver loses lock.

It would also be obvious to duplicate the counter/divider, comparator, thumbwheel switch, latch, LED lamp display and other circuitry so that two secondary stations may concurrently be selected and measurements made, rather than the simpler sequential operation detailed herein.

What I claim is:

1. A method of calibrating a navigation receiver-indicator that provides navigation information by receiving and measuring differences in the time of arrival of signals periodically transmitted by each of a plurality of pairs of transmitters and the difference measurements are plotted on a navigation chart to determine position and comprising the steps of:
    entering the periodic rate of transmission of the signals from said transmitters into said receiver-indicator to make time difference of signal arrival measurements based thereupon,
    comparing said last-mentioned time difference of signal arrival measurement with said signal transmission rate entered into said receiver-indicator to determine if they are equal to each other, said receiver-indicator being in calibration only when said measurement and said transmission rate are equal, and
    adjusting said receiver-indicator so that said time difference of signal arrival measurement and said signal transmission rate are equal as required to calibrate said receiver-indicator.

2. A method of calibrating a LORAN-C navigation receiver-indicator that provides navigation information by receiving and measuring the difference in time of arrival of coded signals periodically transmitted by a master station and ones of a plurality of secondary stations, the time difference of arrival measurements between said master station and at least two of said secondary stations being plotted on a LORAN-C navigation chart to determine the position of said receiver-indicator and said chart having thereon the time perod of signal transmission of each of said master and secondary stations comprising the steps of:
    entering the time period of transmission of said coded signals from said stations into said receiver-indicator which, in response to said time period, measures the difference in time of arrival of sequentially transmitted coded signals from said master station,
    comparing said last-mentioned time difference of signal arrival measurement with said time period entered into said receiver-indicator to determine if they are equal to each other, said receiver-indicator being in calibration only when said last-mentioned measurement and said time period are equal, and
    adjusting said receiver-indicator so that said last-mentioned measurement and said time period are equal as required to calibrate said receiver-indicator.

* * * * *